W. POOLE.
EARTH-AUGER.
No. 180,920.                               Patented Aug. 8, 1876.
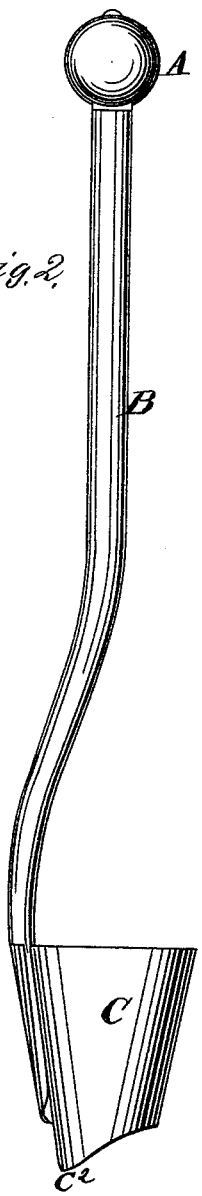

UNITED STATES PATENT OFFICE.

WILLIAM POOLE, OF HUME, NEW YORK, ASSIGNOR OF ONE-HALF OF HIS RIGHT TO JOHN S. MINARD, OF SAME PLACE.

IMPROVEMENT IN EARTH-AUGERS.

Specification forming part of Letters Patent No. 180,920, dated August 8, 1876; application filed July 8, 1876.

*To all whom it may concern:*

Be it known that I, WILLIAM POOLE, of Hume, in the county of Allegany and State of New York, have invented a new and valuable Improvement in Earth-Augers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front elevation of my earth-auger, and Fig. 2 is a side view of the same. Fig. 3 is a bottom view thereof.

The object of my invention is to produce a conical-bladed auger for boring into earth, the same being provided with a shank, which is connected to said blade, and is bent so as to have its upper part in the line of the axis of said blade, thereby at once facilitating the removal of the earth, and allowing the bore to be made vertical.

In the annexed drawing, A designates the lever-handle of an earth-auger; B, the shank secured thereto; and C, the blade, secured to the lower end of said shank by one edge, $c$. Blade C is curled around somewhat like a scroll, with its cutting-edge $c^1$ a little outside of edge $c$, and near thereto, so as to leave a space between them for the earth to enter the interior of said blade. Blade C is shaped like a frustum of an inverted cone, and has a downwardly-extending lip, $c^2$, which makes the first excision at the bottom of the cutting. The conoidal shape of said blade allows it to retain and bring up a greater quantity of loose earth than would otherwise be possible. Shank B is curved in its lower part at $b$, so that its straight upper part $b'$ is in the line of the axis of blade C.

This construction enables the cutting to be made quite vertical, with little strain on either the device or the arms of the operator, which would not be possible if the shank rose vertically from one side of the blade. It also leaves a larger space for the reception of the earth than if the shank were extended into the center of the conical blade, and one of the edges of said blade were curled or bent in to it for attachment.

Thus my invention combines the merits of both the other devices suggested, but omits their defects.

What I claim as new, and desire to secure by Letters Patent, is—

An earth-auger having conoidal blade C, downwardly-extending lip $c^2$, and shank B, which is curved, so as to be connected to said blade by its lower part, while its upper part $b'$ is in the line of the axis of said blade, substantially as set forth.

In testimony that I claim the above I have hereunto subscribed my name in presence of two witnesses.

WILLIAM POOLE.

Witnesses:
WM. FOOTE,
JOHN W. EVERINGHAM.